(12) United States Patent
Yuki et al.

(10) Patent No.: US 9,556,033 B2
(45) Date of Patent: Jan. 31, 2017

(54) EXPANDED GRAPHITE SHEET AND METHOD OF MANUFACTURING SAME

(75) Inventors: Tetsuya Yuki, Mitoyo (JP); Yoshiaki Hirose, Mitoyo (JP)

(73) Assignee: TOYO TANSO CO., LTD., Osaka-shi (JP)

( * ) Notice: Subject to any disclaimer, the term of this patent is extended or adjusted under 35 U.S.C. 154(b) by 841 days.

(21) Appl. No.: 13/879,223

(22) PCT Filed: Oct. 17, 2011

(86) PCT No.: PCT/JP2011/073777
§ 371 (c)(1),
(2), (4) Date: Apr. 12, 2013

(87) PCT Pub. No.: WO2012/053461
PCT Pub. Date: Apr. 26, 2012

(65) Prior Publication Data
US 2013/0202872 A1    Aug. 8, 2013

(30) Foreign Application Priority Data

Oct. 20, 2010  (JP) ................................ 2010-235259

(51) Int. Cl.
*C01B 9/00* (2006.01)
*C01B 31/04* (2006.01)

(52) U.S. Cl.
CPC ........... *C01B 31/0423* (2013.01); *C01B 31/04* (2013.01); *Y10T 428/30* (2015.01)

(58) Field of Classification Search
CPC ..... C01B 31/04; C01B 31/0423; Y10T 428/30
(Continued)

(56) References Cited

U.S. PATENT DOCUMENTS

| | | |
|---|---|---|
| 5,149,518 A | 9/1992 | Mercuri et al. |
| 5,582,811 A | 12/1996 | Greinke et al. |
| 6,828,064 B1 | 12/2004 | Nardi |
| 2003/0148104 A1 | 8/2003 | Kahl et al. |

FOREIGN PATENT DOCUMENTS

| | | |
|---|---|---|
| CN | 1210809 A | 3/1999 |
| JP | 44-23966 | 10/1969 |

(Continued)

OTHER PUBLICATIONS

JP 2620606 Translation Jun. 1997 attaached to JP reference.*
(Continued)

*Primary Examiner* — Daniel H Miller
(74) *Attorney, Agent, or Firm* — Westerman, Hattori, Daniels & Adrian, LLP

(57) ABSTRACT

An expanded graphite sheet is provided that can remarkably improve the quality and yield rate by preventing chipping and cracks in the surface in molding the sheet into a desired shape by inhibiting degradation in the flexibility while reducing the ash content to a certain degree. An expanded graphite sheet (3) has a flexibility of 25 times or greater, as determined in a flexibility test in which the flexibility is defined as the number of times the expanded graphite sheet (3) can be bent using a flexibility testing device having a rotator (2) to which one end of a plate-shaped expanded graphite sheet (3) is fixed, a weight (7) fixed to the other end of the expanded graphite sheet (3), and a bending position determining member (5) for determining a bending position of the expanded graphite sheet (3) when the rotator (2) is rotated.

2 Claims, 2 Drawing Sheets

(58) Field of Classification Search
USPC .......................................................... 428/408
See application file for complete search history.

(56) References Cited

FOREIGN PATENT DOCUMENTS

| JP | 3-45509 A | | 2/1991 |
|---|---|---|---|
| JP | 04-021509 A | | 1/1992 |
| JP | 5-238720 A | | 9/1993 |
| JP | 2620606 | * | 6/1997 |
| JP | 2002-500428 A | | 1/2002 |
| JP | 2003-267781 A | | 9/2003 |

OTHER PUBLICATIONS

International Search Report for PCT/JP2011/073777, Mailing Date of Dec. 27, 2011.
Written Opinion dated Mar. 11, 2014, issued in Corresponding Singapore Patent Application No. 201302677-8, (10 pages).
Japanese Office Action dated Oct. 15, 2014, issued in corresponding Japanese Patent Application No. 2010-235259, w/English translation (12 pages).
Chinese Office Action dated Jun. 20, 2014, issued in corresponding Chinese Patent Application No. 201180048234.8 with English translation (13 pages).
Japanese Office Action dated Jul. 30, 2014, issued in corresponding Japanese Patent Application No. 2010-235259 with English translation (9 pages).

* cited by examiner

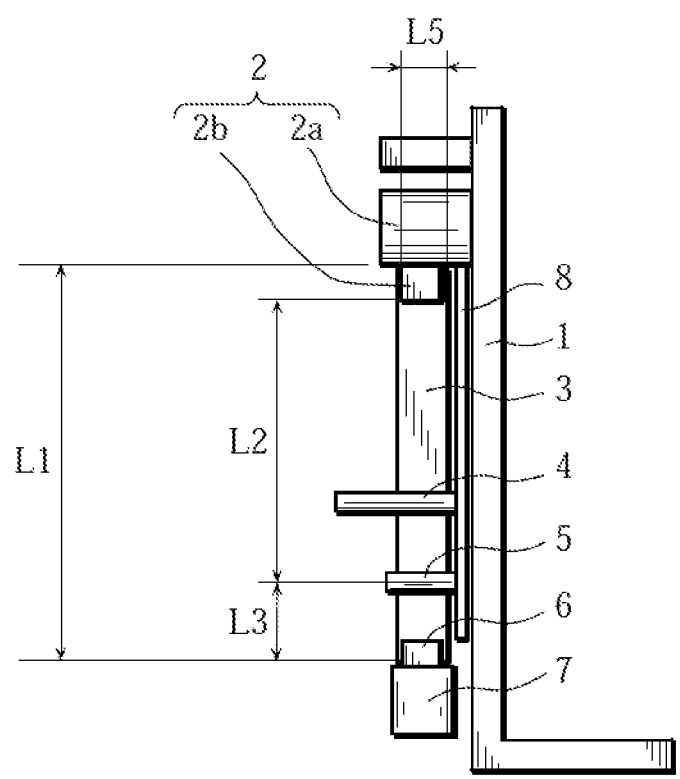

EXPANDED GRAPHITE SHEET AND METHOD OF MANUFACTURING SAME

TECHNICAL FIELD

The present invention relates to an expanded graphite sheet with a low ash content and having flexibility, and a method of manufacturing the same.

BACKGROUND ART

Expanded graphite sheets are commonly fabricated in the following manner. Natural graphite, pyrolytic graphite, kish graphite, or the like is treated with a mixture solution of sulfuric acid, nitric acid, or the like, washed with water, and then dried. Thereafter, the resultant material is subjected to an expansion process in an expansion furnace at about 1000° C., and this is made in a sheet form by pressure-rolling using rollers or the like. The expanded graphite sheets have excellent heat resistance and excellent gas-liquid impermeability. For this reason, they are used for packings, gaskets, mold release sheets in hot pressing, linings for carbon crucibles, heat dissipating members for electronic devices, and the like.

Here, if the expanded graphite sheet contains ash in a large amount, the mating materials such as metal may be damaged in the case where the expanded graphite sheet is used as a packing, a gasket, or the like. In the case where it is used for mold release in hot pressing or the like, it is possible that the ash may be transferred to the materials to be molded and bumps and dents, or patterns may be formed.

In view of this, a technique has been disclosed of obtaining a high-purity expanded graphite sheet that can reduce the content of impurities by subjecting an expanded graphite sheet to a refining process under a halogen gas atmosphere at 800° C. or higher, and this material is also used for a semiconductor manufacturing process (see Patent Document 1 indicated below).

CITATION LIST

Patent Literature

Patent Document 1

Japanese Published Unexamined Patent Application No. H04(1997)-021509 A

SUMMARY OF INVENTION

Technical Problem

However, when an expanded graphite sheet is refined, its flexibility is lowered although the ash content can be reduced. For this reason, cracks or chipping may occur when the expanded graphite sheet is molded in a desired shape to be used as a packing or a gasket as described above. This leads to problems such as degradation in the quality of the molded product and decrease in yield rate.

Accordingly, it is an object of the present invention to provide an expanded graphite sheet that can remarkably improve the quality and yield rate by preventing cracks and chipping in molding the sheet into a desired shape by inhibiting degradation in the flexibility while reducing the ash content to a certain degree.

Solution To Problem

In order to accomplish the foregoing object, the present invention provides an expanded graphite sheet characterized by having a flexibility of 25 times or greater and an ash content of 500 ppm or lower, the flexibility being determined by a flexibility test in which the flexibility is defined as the number of times the expanded graphite sheet can be bent using a flexibility testing device comprising a rotator to which one end of a plate-shaped expanded graphite sheet is fixed, a weight fixed to the other end of the expanded graphite sheet, and a bending position determining, member for determining a bending position of the expanded graphite sheet when the rotator is rotated, wherein the expanded graphite sheet is set to have a width of 10 mm, a thickness of 0.42 mm, and a length of a drooping portion thereof from the rotator of 90 mm, the weight is set at 50 g, the swing angles of the rotator in lateral directions are set at 30 degrees with respect to a vertical direction, and an arrangement position of the bending position determining member is set at 20 mm from a lower end of the expanded graphite sheet.

The above-described configuration makes it possible to inhibit degradation in flexibility while reducing the ash content to a certain degree. As a result, cracks or chipping can be inhibited from occurring in molding the expanded graphite sheet in a desired shape, and therefore, the quality and yield rate of the molded product can be improved remarkably.

It should be noted that in the present specification, the term "ash" refers to metal components such as aluminum and iron, or impurities that derive from the metal components.

Here, it is desirable that the content of sulfur be 500 ppm or higher, and it is especially desirable that the content of ash be 300 ppm or lower and the content of sulfur be 1000 ppm or higher.

Such a configuration makes it possible to obtain the above-described advantageous effects more significantly.

The present invention also provides a method of manufacturing an expanded graphite sheet, characterized by comprising: a step of preparing acid treated graphite by immersing a graphite material having an ash content of 0.1 weight % or lower in an acid treatment solution containing a sulfuric acid and stirring the graphite material with the acid treatment solution; a step of neutralizing the acid treated graphite; a step of performing an expansion process by heating the acid treated graphite having been neutralized, to prepare an expanded graphite; and a step of compressing the expanded graphite.

When an expanded graphite sheet is fabricated without a refining process using a halogen gas as in the just-described method, the flexibility of the expanded graphite sheet is improved because the sulfur component in the sulfuric acid is allowed to remain in the expanded graphite sheet. In addition, it is possible to obtain an expanded graphite sheet in which the ash content is reduced to a certain degree even without a refining process because the graphite material having an ash content of 0.1 weight % or lower is used.

Advantageous Effects of Invention

The present invention enables an expanded graphite sheet to inhibit degradation in the flexibility while reducing the ash content to a certain degree. As a result, cracks or chipping can be inhibited from occurring in molding the expanded graphite sheet in a desired shape. Therefore, a significant advantageous effect can be exhibited that the quality and yield rate of the molded product can be improved remarkably.

BRIEF DESCRIPTION OF DRAWINGS

FIG. 2 is a side view of the flexibility testing device.

DESCRIPTION OF EMBODIMENTS

Figure 1:
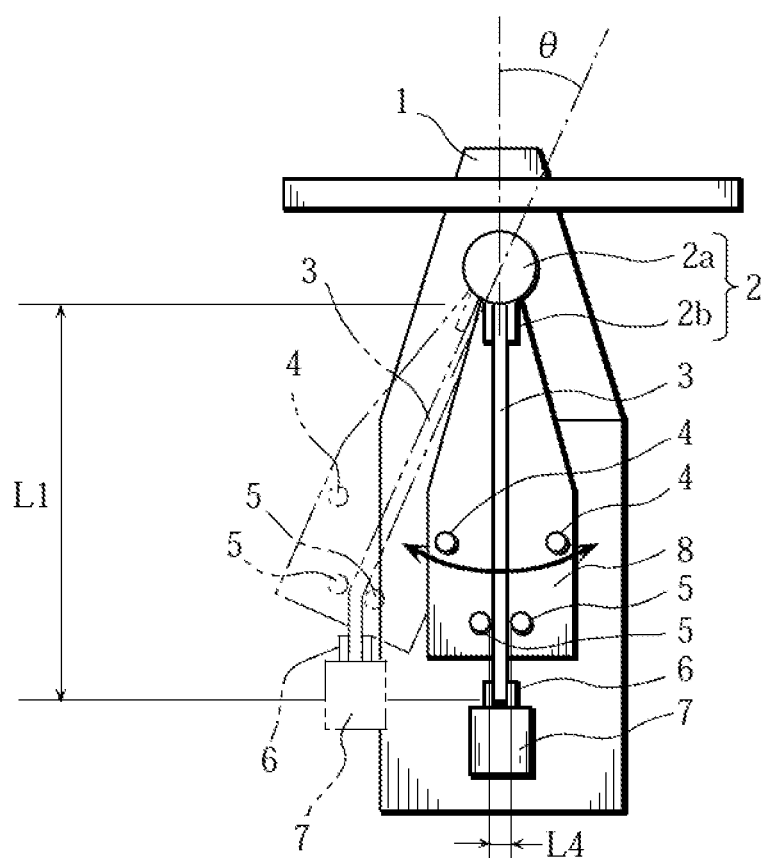
FIG. 1 is a front view of a flexibility testing device* for measuring the flexibility of an expanded graphite sheet.

First, an acid treatment solution was prepared by adding 5 parts by weight of hydrogen peroxide as an oxidizing agent to 100 parts by weight of strong sulfuric acid with a concentration of 98%, and natural graphite having an ash content of 0.01 weight % or lower was immersed and stirred in the acid treatment solution for 30 minutes to cause a reaction, whereby an acid treated graphite was obtained. Next, the resultant acid treated graphite was removed from the acid treatment solution, thereafter washed with water sufficiently to bring the pH closer to 7, and further dried.

Subsequently, the acid treated graphite having been washed with water was put in an electric furnace at a temperature of 800° C. to carry out a heating and expanding process, whereby an expanded graphite was prepared. Thereafter, the expanded graphite was passed between rollers to compress the expanded graphite, so that an expanded graphite sheet having a bulk density of 0.9 $g/cm^3$ was fabricated. This expanded graphite sheet had a length of 100 mm, width of 10 mm, and a thickness of 0.42 mm.

(Other Embodiments)

(1) The graphite used as the raw material is not limited to natural graphite as described above, but may be pyrolytic graphite, kish graphite, and the like. However, it is preferable to use natural graphite flake, which is readily industrially available. Nevertheless, whatever type of graphite is used, it is necessary that the ash content be restricted to 0.1 weight % or lower. In addition, it is desirable that the grain size of the graphite be from 30 mesh to 100 mesh.

(2) The sulfuric acid used in the acid treatment is not limited to the strong sulfuric acid, and it is sufficient as long as a sulfur component is contained, such as with sulfuric anhydride and fuming sulfuric acid. However, for industrial purposes, it is desirable to use a strong sulfuric acid with a concentration of 90% or higher, more preferably a concentration of from 95% to 98%. Moreover, the duration of the immersing and stirring of the graphite is not limited to 30 minutes, but it is desirable that the duration be from about 15 minutes to about 60 minutes.

(3) The oxidizing agent is not limited to hydrogen peroxide as described above, but may be ammonium peroxide, potassium peroxide, and the like. In addition, the amount thereof to be added may be from 1 to 10 parts by weight with respect to 100 parts by weight of the sulfuric acid.

(4) The method for neutralizing the acid treated graphite is not limited to sufficient washing with water, but may be effected by using a sold neutralizer agent selected from oxides of alkaline-earth metals, hydroxides, carbonates, and the like.

(5) The bulk density of the expanded graphite sheet is not limited to 0.9 $g/cm^3$, but should preferably be from 0.5 $g/cm^3$ to 1.3 $g/cm^3$ (especially from 0.7 $g/cm^3$ to 1.3 $g/cm^3$). In addition, the thickness of the expanded graphite sheet is not limited to 0.42 mm but should preferably be from 0.2 mm to 1.0 mm. This range of thickness is the primary range in which the expanded graphite sheet is actually used, and in which the usability and flexibility of the sheet can be well-balanced.

EXAMPLES

Example

An expanded graphite sheet was fabricated in the same manner as described in the foregoing embodiment.

The expanded graphite sheet fabricated in this manner is hereinafter referred to as a present invention sheet A.

Comparative Example 1

An expanded graphite sheet was fabricated in the same manner as described in Example above, except that the natural graphite as the raw material had an ash content of 0.5 weight %.

The expanded graphite sheet fabricated in this manner is hereinafter referred to as a comparative sheet Z1.

Comparative Example 2

An expanded graphite sheet was fabricated in the same manner as described in Example above, except that the natural graphite as the raw material had an ash content of 0.5 weight %, and after preparing the sheet, the sheet was subjected to a refining process in which the fabricated sheet was kept at 2000° C. for 10 hours while a chlorine gas was being supplied thereto.

The expanded graphite sheet fabricated in this manner is hereinafter referred to as a comparative sheet Z2.

Experiment

The ash content, the sulfur content, the flexibility (the number of times the expanded graphite sheet can be bent), and the appearances (the general appearance and the appearance after winding) were determined for the present invention sheet A as well as the comparative sheets Z1 and Z2. The results are shown in Table 1. The ash content, the sulfur content, and the flexibility were measured in the following manners, and the appearances were determined by visual observation.

[Measurement Method for Ash Content]

The ash content of each of the expanded graphite sheets was determined in the following manner. The high-purity expanded graphite sheet was weighed in an amount of 15 g or more with a porcelain crucible, placed into an electric furnace, and heated at 850° C. for 48 hours. From the mass of the sheet before the heating that after the heating, the ash content was determined.

[Measurement Method for Sulfur Content]

The sulfur content was measured using an oxygen flow combustion-infrared spectroscopy method (measurement equipment: sulfur analyzer made by LECO Corp.).

[Measurement Method for Flexibility]

A flexibility testing device as shown in FIGS. 1 and 2 was used for measuring the flexibility of each of the expanded graphite sheets. This flexibility testing device has a base 1. A rotator 2 that is rotatable with respect to the base 1 is disposed near the upper end of the base 1. The rotator 2 comprises a columnar main portion 2a, and a cramping portion 2b that is fixed to a lower portion of the main part 2a for retaining an expanded graphite sheet 3. A rotation plate 8 that is fixed to the rotator 2 and rotates together with the rotator 2 is fixed to the rotator 2. A handle 4 for rotating the rotation plate 8 in the directions indicated by the arrows in FIG. 1 is fixed to the rotation plate 8. Bending position determining members 5 (diameter: 6 mm) are fixed near the lower end of the rotation plate 8. The bending position determining members 5 are for determining the bending position of the expanded graphite sheet 3 when the rotator 2 (the rotation plate 8) is rotated.

A weight 7 is fixed at the lower end of the expanded graphite sheet 3 with a joining part 6. Thereby, when the rotator 2 (the rotation plate 8) is rotated, a load is applied to the expanded graphite sheet 3, so that the expanded graphite sheet 3 is bent at the bending position determining members 5 (see the dash-dot-dot lines in FIG. 2). Here, the width L5 of the expanded graphite sheet 3 is 10 mm, and the length L1 thereof is 100 mm. The distance L2 between the lower end of the rotator 2 and the bending position determining members 5 is 70 mm, the distance L3 between the bending position determining members 5 and the lower end of the expanded graphite sheet 3 is 20 mm, and the distance L4 between the bending position determining members 5 is 2.5 mm. The weight of the above-mentioned weight was set at 50 g, and the swing angle θ of the above-mentioned rotator in lateral directions was set at 30 degrees. In addition, the thickness of the expanded graphite sheet 3 was set at 0.42 mm, and the swing motion cycle of the expanded graphite sheet 3 (the time in which the expanded graphite sheet 3 swings between the following positions: the drooping position→the left end position→the right end position→the drooping position) was set at 2 seconds. The temperature during the experiment is room temperature (25° C.). The number of samples in measuring the flexibility was 10 sheets for each type of the sheets. The term "times" in the column for the flexibility in the table means the number of times of the swing motion cycle until the expanded graphite sheet 3 is cut.

TABLE 1

| Material | Ash content (ppm) | Sulfur content (ppm) | Flexibility (Times) | Appearance General appearance* | Appearance after winding* |
|---|---|---|---|---|---|
| Present invention sheet A | 300 | 1000 | 30-35 | No ash aggregation | No surface change, such as cracks/ bumps and dents |
| Comparative sheet Z1 | 5000 | 1200 | 30-35 | Ash aggregation in a diameter of about 0.5 mm | No surface change, such as cracks/ bumps and dents |
| Comparative sheet Z2 | 30 | 0 | 5-10 | No ash aggregation | Cracks observed in the surface |

*"General appearance" means the appearance of the sheet observed just after fabrication, and "Appearance after winding" means the appearance of the sheet observed after each sheet has been wound around a columnar rod (diameter 50 mm).

As clearly seen from Table 1 above, in general appearance, the present invention sheet A and the comparative sheet Z2 showed no ash aggregation, but the comparative sheet Z1 showed an ash aggregation in a diameter of about 0.5 mm. The reason is believed to be as follows. While the present invention sheet A and the comparative sheet Z2 had an ash content of 300 ppm and an ash content of 30 ppm, respectively, the comparative sheet Z1 had an ash content of 5000 ppm, which is considerably higher.

In terms of the appearance after winding, no change in surface, such as cracks or bumps and dents, was observed in the present invention sheet A and the comparative sheet Z1. On the other hand, cracks were observed in the surface of the comparative sheet Z2. Moreover, the present invention sheet A and the comparative sheet Z1 exhibited a flexibility ranging from 30 times to 35 times. On the other hand, the comparative sheet Z2 showed a flexibility ranging from 5 times to 10 times. The reason is believed to be that while the present invention sheet A and the comparative sheet Z1 had a sulfur content of 1000 ppm and a sulfur content of 1200 ppm, respectively, the comparative sheet Z2 had a sulfur content of 0 ppm.

From the foregoing, it will be understood that the present invention sheet A has good general appearance and good appearance after winding, and moreover it shows excellent flexibility.

INDUSTRIAL APPLICABILITY

The present invention can be applied to packings, gaskets, mold release sheets in hot pressing, linings for carbon crucibles, heat dissipating members for electronic devices, and the like.

REFERENCE SIGNS LIST

2—Rotator
3—Expanded graphite sheet
5—Bending position determining member
7—Weight

The invention claimed is:
1. An expanded graphite sheet characterized by having a flexibility of 25 times or greater and an ash content of 500 ppm or lower, the flexibility being determined by a flexibility test in which the flexibility is defined as the number of times the expanded graphite sheet can be bent using a flexibility testing device comprising a rotator to which one end of a plate-shaped expanded graphite sheet is fixed, a weight fixed to the other end of the expanded graphite sheet, and a bending position determining member for determining a bending position of the expanded graphite sheet when the rotator is rotated, wherein the expanded graphite sheet is set to have a width of 10 mm, a thickness of 0.42 mm, and a length of a drooping portion thereof from the rotator of 90 mm, the weight is set at 50 g, the swing angles of the rotator in lateral directions are set at 30 degrees with respect to a vertical direction, and an arrangement position of the bending position determining member is set at 20 mm from a lower end of the expanded graphite sheet and;
wherein the content of sulfur is 500 ppm or higher.
2. The expanded graphite sheet according to claim 1, wherein the content of ash is 300 ppm or lower and the content of sulfur is 1000 ppm or higher.

* * * * *